Patented Oct. 9, 1951

2,570,449

UNITED STATES PATENT OFFICE 2,570,449

METHOD OF PRODUCTION OF SYNTHETIC MATERIAL FROM STARCH OR STARCH CONTAINING SUBSTANCES

Drahomír Horsák, Brunn, Czechoslovakia

No Drawing. Application January 4, 1947, Serial No. 720,322. In Czechoslovakia January 19, 1946

2 Claims. (Cl. 18—54)

The present invention relates to a method of production of synthetic material from starch or starch containing substances, and of articles therefrom.

It has already been suggested to use starch as raw material, for the production of synthetic masses, but the chief drawback of all the known methods resides therein that the shaping of the material obtained is carried out mostly by pouring or spreading and subsequent drying of the finished articles. This method is exceedingly slow and subsequent drying results in deformation, cracking or other damage to the articles.

The main object of the present invention is, therefore, to provide a method by which the above drawbacks are eliminated.

A further object of the invention is to provide a method by which a new kind of synthetic material from starch as raw material may be obtained.

Another object of the present invention is to provide a method by which the possibility of using starch in the field of plastics is considerably extended.

Further objects and advantages of the invention will appear from the ensuing description and from the appended claims.

According to the main feature of the invention starch is transformed into a so-called pseudothermoplast by the addition of softeners or fluxes.

The expression "pseudo-thermoplastics" as used in this specification is intended to denote materials which, by the influence of elevated temperature and in particular under simultaneous influence of increased pressure, may be softened to such a degree that they can be brought into liquid state, and in this condition may be shaped as desired or, in other words, that they have acquired the property of thermoplasticity. The shaping may be effected, for example, by processes used in connection with thermoplastics, e. g. injection moulding into cooled moulds. It should, however, be understood that "pseudo-thermoplastics" differ from thermoplastics in that the softening or liquifying of the pseudo-thermoplastics is caused by softeners, solvents, or fluxes present, without which it would be impossible to bring them, by any pressure or temperature, into soft or liquid condition necessary for shaping, since they do not melt as such.

The softeners used may be preferably hygroscopic substances, such as glycerine, calcium chloride, magnesium chloride or the like, and they are added in quantities from 30% to 50% as required, with a view to the desired viscosity of the obtained mass and to the elasticity desired in the finished article.

Starch may also be transformed into pseudothermoplastics by the addition of a "flux." Under the expression "flux" organic matter is understood having a melting or softening point above 50° C.; as example of a flux, urea may be named.

During any desired stage of production, starch is gelatinised, the amount of water being as low as possible, preferably about 50% by weight of the starch, but when required, higher amounts of water may be added.

A perfect gelatinisation of starch under minimum addition of water being difficult, the gelatinising operation may be carried out either by rolling the previously prepared mixture of starch with water and other auxiliary substances between heated cylinders or by extruding this mixture through a nozzle, which, if required may have a length of several meters, and be divided into zones of varying temperatures.

Thus for instance, the mixture may pass at first through a heating zone, having a temperature of 55 to 70° C., then through the gelatinising zone (up to 99° C.), and finally through the cooling zone (about 20° C.).

After gelatinisation has taken place the starch is dried, ground into fine flour, and shaped into articles of any desired form by any required shaping operation, employed in connection with thermoplastics, such as injection moulding into a cold mould, extrusion through nozzles, or rolling between cylinders.

The said softeners or fluxes are added to the starch before its mechanical shaping.

The same applies to auxiliary substances, such as dyestuffs or pigments and fillers, such as woodflour, cellulose fibres, and the like, if such additions are desirable or required with respect to the quality and kind of the articles produced.

It should be noted that in the manner set forth above it is possible to treat not only starch itself, but also the raw material from which it is obtained, particularly corn (maize), potatoes, soya, rice, and the like.

Starch may be manufactured with considerable advantage according to the invention into fibres, flexible sheets (replacing paper or cellophane felt), flexible profiled bodies, covers, containers, boxes, cases, or other products made heretofore from cardboard. The fibres obtained may be easily and advantageously further manufactured into paper, cardboard or felt by processes known per se.

Very good results may be obtained, if during any production stage photo-chemically sensitive compounds are added to the starch, in particular compounds of chromium, silver, or the like, or if the finished articles are treated with solutions of such compounds. Twofold results may be obtained in this way.

A. Material suitable to be employed in photography is produced;

B. By the influence of photochemically active rays, such as ultraviolet rays, the liability of the starch products to swell in water and other liquids is reduced.

The mechanical shaping operations are carried out preferably at temperatures below 100° C., if fluxes are used having a melting point under 100° C. Temperatures over 100° C. are used, if fluxes are present having a melting point above 100° C.

The starch, to which softeners, fluxes or other auxiliary substances have been added, may, after preceding gelatinisation or simultaneously with the latter, be extruded through fine nozzles, either into air or another gaseous medium or into liquid baths, which assist, accelerate or make possible the extrusion from the said nozzles of starch fibres or sheets. If the nozzles are divided into several zones, as mentioned above, particular care has to be taken with regard to the shaping and cooling zone. If liquid baths are used, liquids, such as ketones, alcohols or the like, in which starch or starch gel are not dissolved or do not swell, are given preference.

In a modified embodiment of the invention, it is possible to add during any stage of production photochemically active compounds to the starch or starch pseudo-thermoplast, particularly such as contain chromium, silver or the like, under exclusion of active rays, or the finished articles (fibres, sheets or the like) are treated with such compounds. Articles or materials treated in this way may then be subjected to the action of photochemically active rays, and in the case of employment of chromium compounds may be developed in a way similar to the chromium treated gelatine said development being carried out preferably in a bath containing enzymes, in particular diastase, which cause liquefaction and decomposition or solution of starch.

The employment of starch as raw material for the obtaining of the said thermoplastics and further for the production of shaped articles, is in particular advantageous, because the articles produced, after having fulfilled their service, may be easily regenerated into original pseudo-thermoplastics or may be further used as starch containing raw-materials, e. g. in the fermentation industry for the production of alcohols, sugar or the like. The starch renders therefore twofold service, which if considered from the point of raw-material policy is an additional service of extreme economic importance.

In a further development of the invention, the starch or starch containing material in partially or entirely gelatinised condition, may be extruded through suitably dimensioned nozzles, in particular so as to yield fibres or sheets, into baths, containing any desired proportions alternatively or in combination of:

a. Substances which do not dissolve starch, such as methanol or the like;

b. Substances in which starch does not swell, such as acetone or the like;

c. Substances which act as softeners, such as glycerine or the like;

d. Substances which dissolve or dilute starch, such as water and the like.

Starch or starch containing materials may be enriched by auxiliary, suitably selected substances, before the extruding operation, in particular with diluting agents (water), softeners (e. g. glycerine), and dyes (e. g. aniline dyestuffs).

Also in this case the extruding operation may be carried out in various zones with different temperatures of starch, starch containing raw-materials, nozzles, or precipitation baths. The articles obtained, such as fibres or sheets, may be freed from the excess of undesired substances, in particular water, precipitating chemicals, or the like, preferably under preliminary, simultaneous, or subsequent enriching with suitable softeners.

The removal of undesirable substances may be carried out under simultaneous felting e. g. into paper, cardboard, felt or the like, preferably with the addition of other fibres. The obtained bodies or fibres may be, either alone or in combination with other bodies e. g. cellulose fibres, wood-pulp or the like, felted into paper, card-board felt or the like in a way, or in devices, known per se.

A few examples of this modified embodiment of the invention will now be given:

*Example 1*

One part of potato starch is mixed with 7 parts of water and 0.3 part of pure glycerine into starch milk, which under thorough agitation is heated to a temperature of about 80° C. to achieve the best gelatinising results. The obtained starch gel is sifted through very fine sieves to remove mechanical impurities and extruded through a nozzle of 0.1 mm. orifice under normal temperature into a methanol bath, containing in one part about 0.1 to 0.3 part of pure glycerine. Fine fibres are thus obtained which, after leaving the bath, are wound on a reel under simultaneous removal of methanol, an excessive humidity, or water. If these fibres, after leaving the bath, are laid on sieves upon each other, preparatory to the evaporation of methanol, they are felted in a way similar to the production of paper, cardboard or felt. This process may be modified as desired by the quantity of superimposed fibres, or by the amount of pressure to which the sieves are subjected, or the like.

*Example 2*

A starch gel containing one part of potato starch, 2 parts of water, 0.2 part of glycerine, and 0.01 part of aniline dyestuff is prepared. After thorough removal of mechanical impurities by filtration, the gel is brought to a temperature of 70° C. and extruded in vertical direction through a nozzle with an orifice of 0.55 mm. diameter into a vertical tube of a diameter of about 50 mm., through which air, cooled down to about 1° to 5° C., is passed in countercurrent as far as the orifice of the nozzle. A coloured starch fibre is obtained, which may be directly wound on a spool either alone or in combination with other fibres, manufactured after drying into textile material, paper, cardboard or the like.

A further modification of this process consists therein that instead of passing cool air to the orifice of the nozzle, cooling water is used, flowing in the cooling jacket, the nozzle being subdivided into zones of varying temperature. It is, however, possible to omit this provision, if the temperature of the extruded starch gel is maintained at working-room temperature, such as 20° C. In this case the extrusion of gel requires far higher pressures and the obtained fibres have different mechanical properties (strength).

The examples shown prove that starch and starch containing materials may be manufactured in the described manner into fibrous or sheet-like bodies in a manner that has never succeeded before.

The expression "synthetic material" in the claims is intended to include fibers, threads, flexible sheets of all kinds, such as wrapping foils, films, ribbons, straps, felt, paper, cardboard, and profiled bodies, as containers, covers, cases, boxes, and similar articles.

By "starch-containing materials" I intend to include starch or materials containing starch, such as corn (maize), potatoes, soya, rice, and the like.

The expression "shaping" is intended to include injection molding into a cold mold, extrusion through nozzles, rolling between cylinders, and in general any of the common shaping operations used in connection with the manufacture of thermoplastics.

It is, of course, to be understood that the above description is merely illustrative and in no way limiting and that I consider my invention to include such modifications as are within the scope of the following claims.

I claim:

1. A process for producing synthetic threads, and the like from starch-containing material, which comprises adding water and at least one substance capable of imparting thereto thermoplasticity to the material to convert the material into a pseudo-thermoplast, gelatinizing said material, eliminating the excess water present in the gelatinized mass, extruding said gelatinized mass at raised temperature and increased pressure, and passing the extruded material through a liquid bath having a hardening action on the shaped material but leaving the starch component otherwise unaffected.

2. A process for producing synthetic threads and the like from starch containing material, which comprises adding to said material water and a susbtance capable of imparting thereto thermoplasticity to convert the material into a pseudo-thermoplast and also light sensitive substances, gelatinizing said material, removing the excess water present in the gelatinized mass by extrusion at raised temperature and increased pressure into the desired shape, stabilizing the shaped and extruded mass, and subjecting the prepared mass to the action of photochemically active rays whereby the starch component loses its readiness to be effected by water.

DRAHOMÍR HORSÁK.

REFERENCES CITED

The following references are of record in the file of this patent:

UNITED STATES PATENTS

| Number | Name | Date |
|---|---|---|
| 1,878,852 | Hoppler et al. | Sept. 20, 1932 |
| 2,027,682 | Eichmann et al. | Jan. 14, 1936 |
| 2,137,169 | Levey | Nov. 15, 1938 |
| 2,171,796 | Kelling | Sept. 5, 1939 |
| 2,241,376 | Carter | May 13, 1941 |
| 2,306,120 | Gugger | Dec. 22, 1942 |

OTHER REFERENCES

Walton's Comprehensive Survey of Starch Chemistry, vol. 1, Part II—Copy in Div. 43—section 1186, page 117 and section 755, page 77.